No. 606,720. Patented July 5, 1898.
G. H. HULETT.
LOADING OR UNLOADING MACHINE.
(Application filed Feb. 4, 1897.)
(No Model.) 6 Sheets—Sheet 1.

No. 606,720. Patented July 5, 1898.
G. H. HULETT.
LOADING OR UNLOADING MACHINE.
(Application filed Feb. 4, 1897.)
(No Model.) 6 Sheets—Sheet 2.

No. 606,720. Patented July 5, 1898.
G. H. HULETT.
LOADING OR UNLOADING MACHINE.
(Application filed Feb. 4, 1897.)

(No Model.) 6 Sheets—Sheet 4.

Witnesses
E. J. Nottingham
G. F. Downing

Inventor
G. H. Hulett
By H. A. Seymour
Attorney

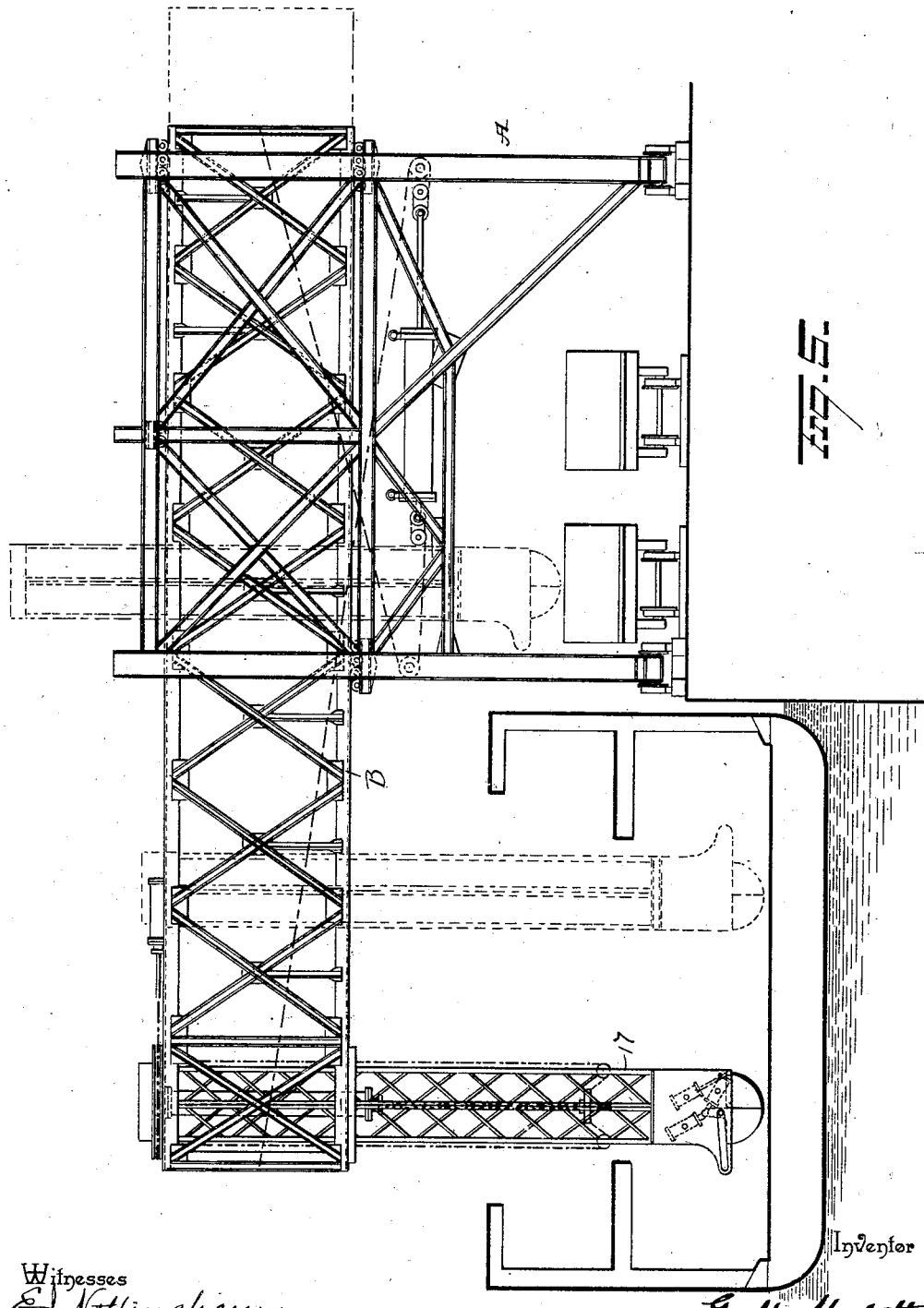

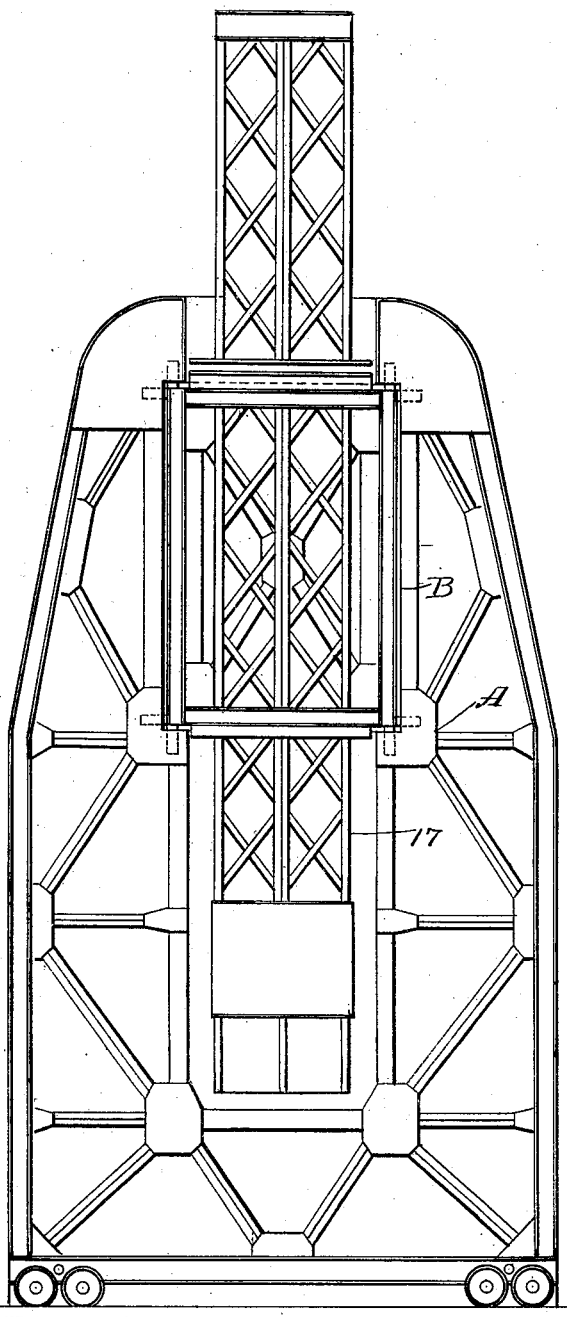

UNITED STATES PATENT OFFICE.

GEORGE H. HULETT, OF CLEVELAND, OHIO.

LOADING OR UNLOADING MACHINE.

SPECIFICATION forming part of Letters Patent No. 606,720, dated July 5, 1898.

Application filed February 4, 1897. Serial No. 621,983. (No model.)

*To all whom it may concern:*

Be it known that I, GEORGE H. HULETT, a resident of Cleveland, in the county of Cuyahoga and State of Ohio, have invented certain new and useful Improvements in Loading or Unloading Machines; and I do hereby declare the following to be a full, clear, and exact description of the invention, such as will enable others skilled in the art to which it appertains to make and use the same.

My invention relates to an improvement in loading and unloading machines, the object being to provide improved means for scooping up ore from beneath the decks of vessels by means of machinery; and it consists in an endwise-movable beam in connection with a depending leg and means connected therewith for reaching out laterally beneath the decks of vessels.

It further consists in mechanism for reaching out laterally beneath the deck of a vessel and scooping up the contents of the vessel and removing it to the place where it is to be deposited.

It still further consists in certain novel features of construction and combinations of parts, which will be hereinafter described, and pointed out in the claims.

Figure 1:
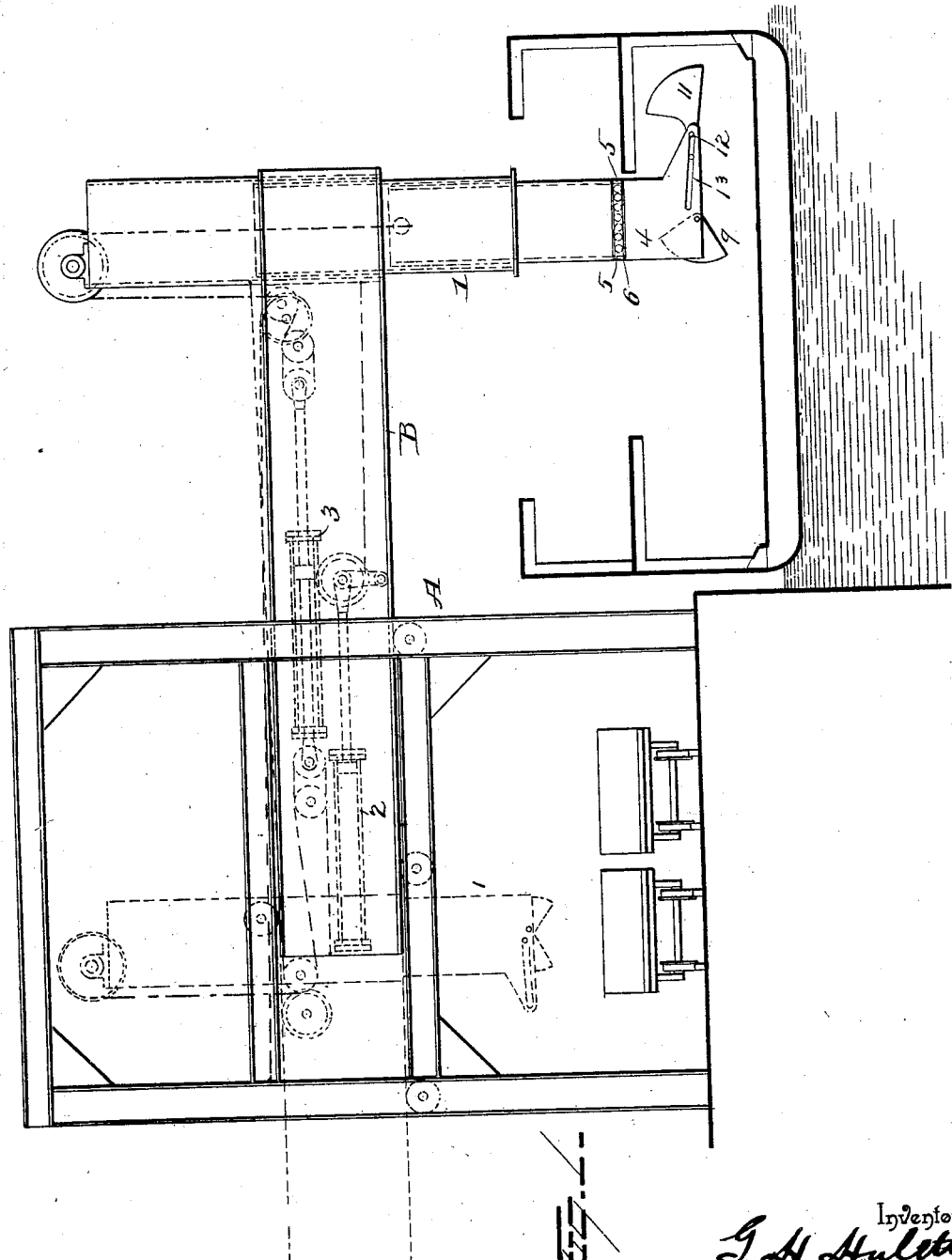
Figure 2:
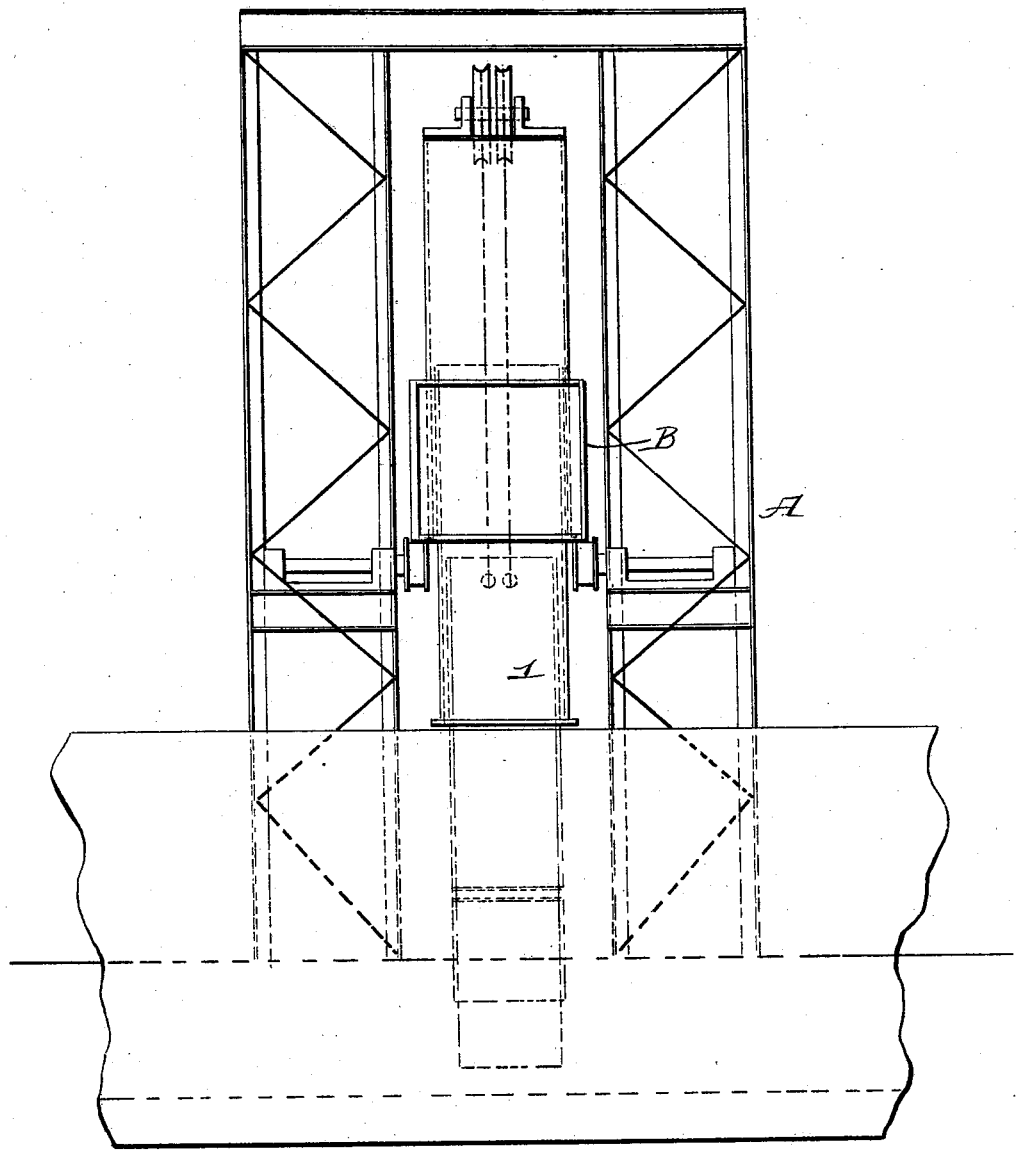
Figure 3:
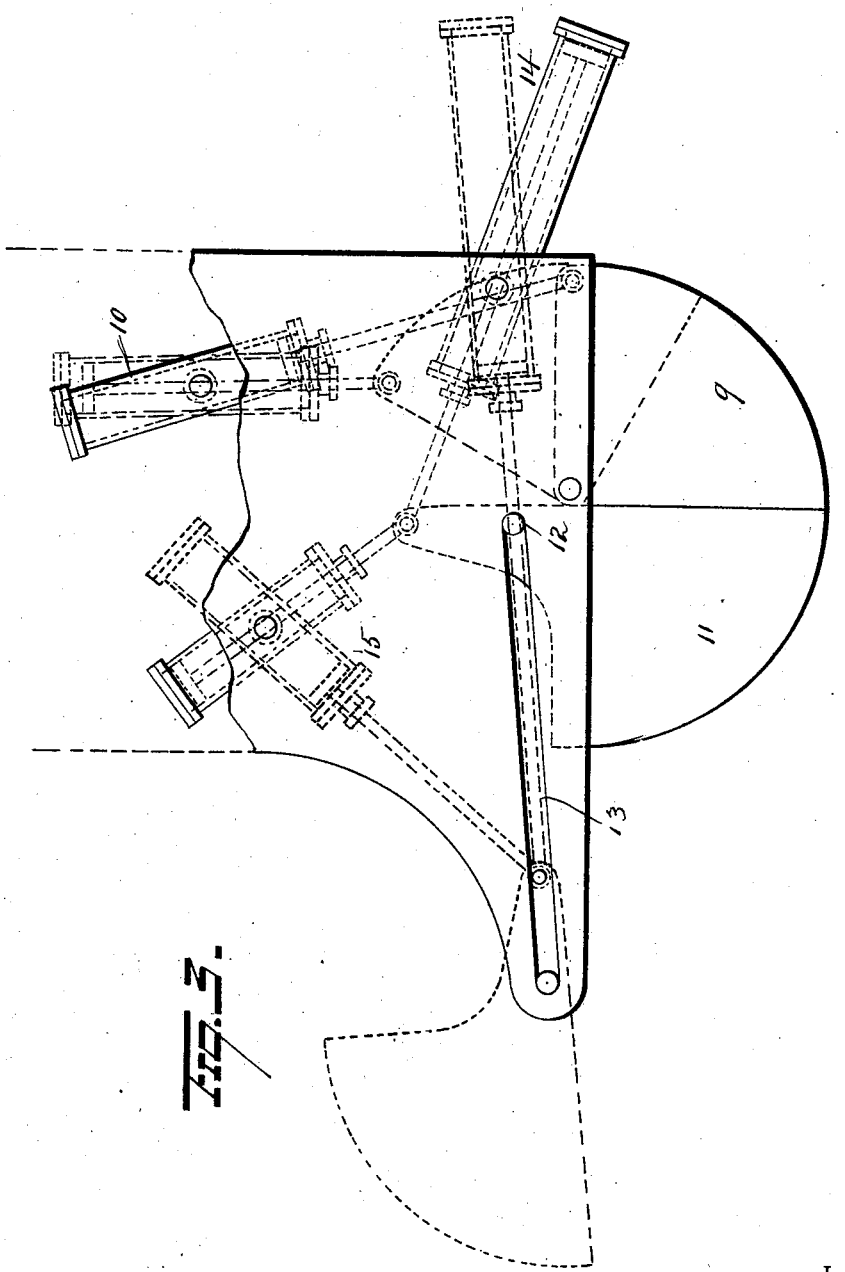
Figure 4:
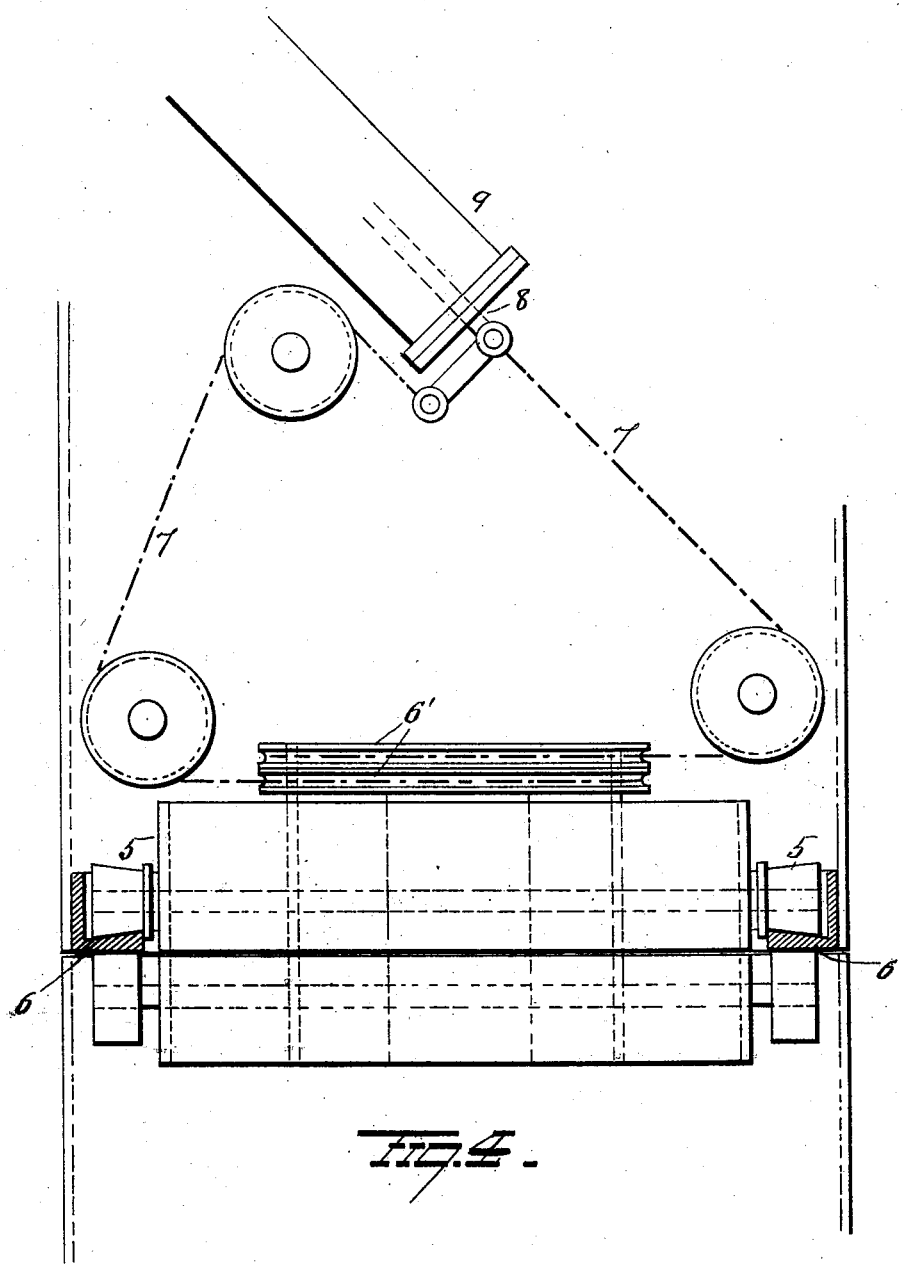

In the accompanying drawings, Figure 1 is a view in side elevation of my improved apparatus. Fig. 2 is a view in end elevation. Fig. 3 is an enlarged view in detail, showing the foot with scoops or buckets attached. Fig. 4 is an enlarged detail view showing means for turning the foot, which carries the scoop or bucket. Fig. 5 is a view of a modified form of construction, and Fig. 6 is an end elevation of the same.

A represents a frame, and B a beam which is mounted and slides between rollers on the frame when the beam is shifted to bring the scoop or bucket into a position to fill or unload. A leg 1 depends from the outer end of this beam and is adapted to reach down into the hold of a vessel and to be withdrawn vertically therefrom. For this purpose the leg shown in Figs. 1 and 2 is composed of two or more telescoping sections, the lower sections of which preferably slide into the next adjacent sections above when elevated. A pair of hydraulic rams or equivalent devices 2 and 3 are located on the frame, and one is applied to the work of shifting the beam and the other to raising or lowering the lower end of the leg. The rams are equipped with cables for operating the several parts, and water is supplied to the rams through a pipe or hose. (Not shown.) Other operating means may of course be employed besides hydraulic rams—as, for instance, steam or electric engines. At the lower end of the leg a revolubly-supported section 4 is located. This section is provided with rollers 5 5, which travel around on an annular track 6 on the lower end of the leg. This lower section 4 is furnished with two drums 6' 6', and cables 7 7, extending from the piston-rod 8 of ram 9, are wound in opposite directions around the two drums, so that as the piston-rod moves endwise in either direction it turns the drums and connected lower section 4 in one direction or the other to effect a complete or partial revolution of the section.

Connected with section 4, at or near its extreme lower end, is the scooping mechanism. This comprises in the present instance a pivoted bucket 9, which is operated by a hydraulic ram 10 and a sliding bucket 11, which reaches out laterally beneath the decks of the vessel and rakes or draws the ore to the bucket 9, with which it then coöperates in tightly inclosing and hoisting the ore from the vessel. This sliding bucket is provided with a pivot 12, which operates in an elongated slot 13, in which it both slides and turns. Connected with it are two hydraulic rams 14 and 15, one of which operates to slide it in and out and the other to swing it in a vertical plane. These three cylinders for operating the two buckets are supplied by pipes or hose (not shown) and controlled by suitable valves, in the one instance to swing the bucket 9 up and down and in the other to both slide and swing the bucket to cause it to reach out over the ore and then down into it and then to rake or draw it toward and into bucket 9 and finally shut in and inclose the two bucketfuls. This operation is performed by the proper manipulation of the valves by the operator, who may be stationed at some convenient position in the lower section 4 or at some other point on the machine.

In the modification the leg 17 is made in one single cylindrical piece and has a sliding as well as a rotary connection with the beam, hydraulic rams or other means being employed for operating and controlling it.

In addition to the mechanism described it is evident that any means of support might be employed so long as the essential features, as the up-and-down movement of the leg and the lateral reaching out of the scooping mechanism, is adhered to, whereby provision is made for removing ore by machinery from points all around the hatch of the vessel.

Having fully described my invention, what I claim as new, and desire to secure by Letters Patent, is—

1. In a loading and unloading machine, the combination with a beam movable outwardly from its support, of a leg depending therefrom and movable at right angles thereto, and mechanism located at the lower end of the leg and constructed and adapted to reach out laterally from the leg and to be elevated by the upward endwise movement of the leg.

2. In a loading and unloading machine, the combination with an endwise-movable beam projecting laterally from its support, of a non-pivotal leg movable endwise up and down with respect to the beam, and a scoop connected with and operated from the lower end of the leg.

3. In a loading and unloading machine, the combination with a support, of a depending non-pivotal endwise-movable leg, a foot rotatably connected with the lower end of the leg, and a scoop connected with and operated from the foot.

4. In a loading and unloading machine, the combination with a main support, a beam movable endwise with respect thereto, of a leg composed of two or more telescoping tubes depending from the beam, a foot rotatably connected with the lower section of the leg, and a scoop reaching out from the lower end of the foot.

5. The combination with the depending leg of a loading and unloading machine, of two buckets pivoted to the leg, and one having a sliding connection therewith, and hydraulic rams for operating the two buckets.

6. The combination in loading and unloading machine, with a depending leg, and a rotary section connected therewith, of a bucket having a sliding pivotal connection with the rotary section, and means for swinging and sliding this bucket whereby to reach out laterally and scoop up material from any side of the leg.

7. The combination with a leg, of a foot rotatably connected with the lower end of the leg, said foot having drums connected therewith, and means connected with these drums for turning the foot in either direction.

In testimony whereof I have signed this specification in the presence of two subscribing witnesses.

GEORGE H. HULETT.

Witnesses:
VERNON E. HODGES,
A. W. BRIGHT.